United States Patent
Franz et al.

(10) Patent No.: US 11,526,513 B2
(45) Date of Patent: Dec. 13, 2022

(54) SQL INTERFACE FOR EMBEDDED GRAPH SUBQUERIES

(71) Applicant: SAP SE, Walldorf (DE)

(72) Inventors: Gerald Franz, Walldorf (DE); Bastian Erler, Walldorf (DE); Hannes Jakschitsch, Walldorf (DE); Romans Kasperovics, Speyer (DE); Roland Sedler, Leimen (DE); Florian Schimmel, Rauenberg (DE)

(73) Assignee: SAP SE, Walldorf (DE)

( * ) Notice: Subject to any disclaimer, the term of this patent is extended or adjusted under 35 U.S.C. 154(b) by 164 days.

(21) Appl. No.: 16/735,981

(22) Filed: Jan. 7, 2020

(65) Prior Publication Data
US 2021/0209104 A1    Jul. 8, 2021

(51) Int. Cl.
| | |
|---|---|
| *G06F 16/2453* | (2019.01) |
| *G06F 16/242* | (2019.01) |
| *G06F 16/22* | (2019.01) |
| *G06F 16/901* | (2019.01) |

(52) U.S. Cl.
CPC .... *G06F 16/24535* (2019.01); *G06F 16/2282* (2019.01); *G06F 16/2438* (2019.01); *G06F 16/9024* (2019.01)

(58) Field of Classification Search
CPC .......... G06F 16/24535; G06F 16/2282; G06F 16/2438; G06F 16/9024
See application file for complete search history.

(56) References Cited

U.S. PATENT DOCUMENTS

| | | | |
|---|---|---|---|
| 2014/0172914 A1* | 6/2014 | Elnikety | G06F 16/9024 707/774 |
| 2018/0081936 A1* | 3/2018 | Chen | G06F 16/24544 |
| 2019/0228084 A1* | 7/2019 | Ishii | G06F 16/24544 |

* cited by examiner

*Primary Examiner* — William B Partridge
*Assistant Examiner* — Erich Alexander Fischer
(74) *Attorney, Agent, or Firm* — Mintz Levin Cohn Ferris Glovsky and Popeo, P.C.

(57) ABSTRACT

A method, a system, and a computer program product for querying graph data. A graph workspace object is identified. One or more parameters for executing a declarative language query are identified. Using the identified parameters, the declarative language query is executed on the identified graph workspace object. Based on the executed declarative language query, one or more tables responsive to a request to access graph data stored in a relational database are processed.

17 Claims, 8 Drawing Sheets

SQL INTERFACE FOR EMBEDDED GRAPH SUBQUERIES

TECHNICAL FIELD

This disclosure relates generally to data processing and, in particular, to querying graph data from a relational database, and more particularly, extending an interface (e.g., an SQL interface) for embedded graph subqueries written in a different language.

BACKGROUND

A database may be configured to store data in accordance with a database schema. For example, in a graph database, data may be represented and stored using graph structures including, for example, vertices, directed edges, undirected edges, and/or the like. Notably, the graph database may store the relationships between different data items explicitly. For instance, the vertices of a graph may correspond to the individual data items stored in the graph database while the edges of the graph may define the relationships between these data items. Attributes associated with the vertices and/or the edges may provide additional properties for the data items stored in the graph database and/or the relationships that exist between different data items.

By contrast, a relational database may store the relationships between different data items implicitly, for example, by organizing the data items into one or more database tables. Each database table may store a set of data items referred to as a relation. Furthermore, the rows of the database table may hold individual data items while the columns of the database table may hold the attributes that are present in each of the data items. Meanwhile, relationships between data items residing in different database tables may be implicitly defined by cross referencing the key that is associated with each data item in the relational database. For instance, a first database table may store the keys of data items from a second database table, thereby linking data items held in two separate database tables. Alternately and/or additionally, data items from the first database table and the second database table may be linked via a third database table storing the keys of data items from both the first database table and the second database table.

SUMMARY

In some implementations, the current subject matter relates to a computer implemented method for querying graph data. The method may include identifying a graph workspace object, identifying one or more parameters for executing a declarative language query, executing, using the identified one or more parameters, the declarative language query on the identified graph workspace object, and processing, based on the executed declarative language query, one or more tables responsive to a request to access graph data stored in a relational database.

In some implementations, the current subject matter may include one or more of the following optional features. As stated above, the graph workspace object may be identified in response to the received request to access graph data and/or be a previously defined graph workspace object stored in the relational database. Alternatively, the definition of the graph workspace object may include determining one or more references to one or more tables stored in the relational database. A combination of the one or more tables may correspond to the graph data being requested in the received request.

In some implementations, the declarative language query may be a previously generated declarative language query that may be configured to use the identified parameters that may have any value.

In some implementations, the process may also include executing a structured query language (SQL) query on the resulting processed table which can also be combined with more tables.

In some implementations, the parameters may be defined using a structured language query string. Further, the graph workspace object may also be defined using a structured language query identifier. The graph data may include at least one of the following: one or more vertices, one or more edges, and any combination thereof.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

A relational database may be configured to store a graph by at least storing the corresponding graph data in a vertex table and an edge table. For example, storing the graph in the relational database may include storing, in the vertex table, the vertices of the graph including, for example, the keys and the attributes associated with each vertex. Furthermore, storing the graph in the relational database may include storing, in the edge table, the edges of the graph including, for example, the keys and the attributes associated with each edge. In some implementations, the current subject matter may be applicable to federated systems, where graph data is not necessarily stored in a relational database, but may be queried from a relational database using a subquery (hence, allowing combination of graph and relational data in a single query result).

Figure 1:
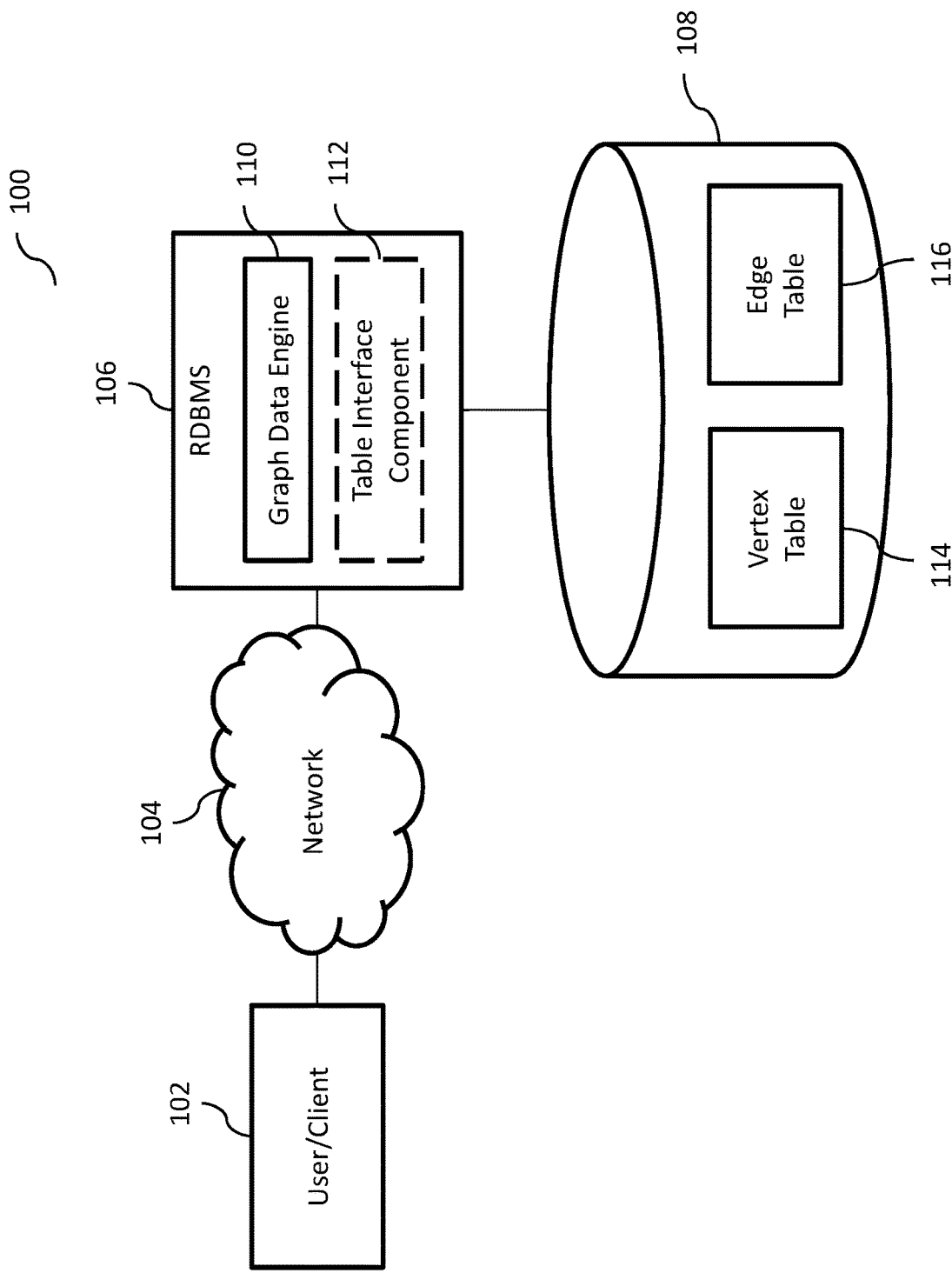
FIG. 1 illustrates a system diagram illustrating a data storage system, according to some implementations of the current subject matter.

FIG. 1 illustrates a system diagram illustrating a data storage system 100, according to some implementations of the current subject matter. The system 100 may include a relational database management system (RDBMS) 106, a database 108 storing graph data, and a user/client 102. In some implementations, the database 108 may be a relational database configured to store graph data, for example, in a vertex table 114 and/or an edge table 116. The database 108 may be any type of database including, for example, an in-memory database, a hierarchical database, an object database, an object-relational database, a non-Structured Query Language (NoSQL) database, and/or the like. The database 108 may be a graph database, a column store, a key-value store, a document store, and/or the like.

The database 108 may be communicatively coupled with the relational database management system 106 that may include a graph data engine 110. It may also include an optional table interface component 112. The database management system 106 may be configured to respond to requests from one or more users 102 of the data storage system 100. The user 102 may communicate with the database management system 106 via a network 104, which may be any wired and/or wireless network including, for example, a public land mobile network (PLMN), a wide area network (WAN), a local area network (LAN), a virtual local area network (VLAN), the Internet, and/or the like. The user 102 may send to the database management system 106 a request to execute, on at least a portion of the graph data stored in the database 108, a graph algorithm including, for example, shortest path, risk propagation, minimum flow, page rank, and/or the like. A graph algorithm may be any algorithm that derives a solution by operating on graph data which may include vertices interconnected by one or more directed and/or undirected edges. The graph algorithm may be any predefined graph algorithm and/or a custom graph algorithm defined by the user 102. In some implementations, the graph data may be constructed from one or more tables and may be stored in the database 108.

In response to the request from the user 102, the graph data engine 110 (which may include one or more processors and/or memory) and/or the optional table interface component 112 of the relational database management system 106 may be configured to generate an interface for accessing data from one or more tables stored in the database 108. The graph data engine 110 may be configured to execute the graph algorithm of the request by querying the graph data stored in the database 108 to obtain the desired results. The generated interface may be used to present results responsive to the user 102's request In the federated systems exemplary implementation, the optional table interface component 112 may be used to generate a query to the source system corresponding to the referred graph object using information from a catalog. The results may be arranged in a tabular format. The tabular arrangement of the results may be queried using one or more SQL queries (including, but not limited to, table, view, etc. functions). In some implementations, the request from the user 102 may be in a declarative graph query language such as, for example, openCypher and/or the like.

Figure 2:
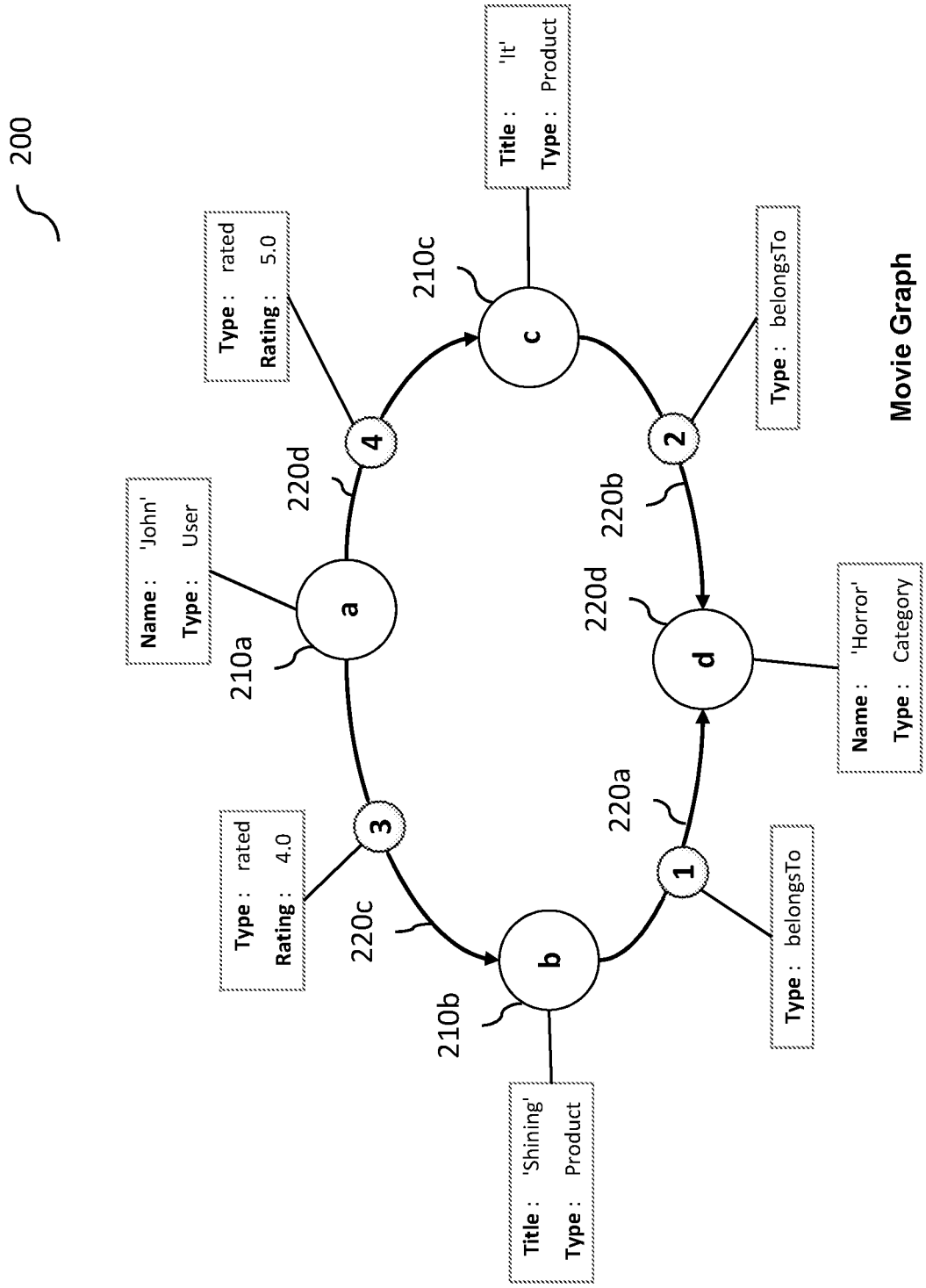
FIG. 2 illustrates an exemplary graph data, according to some implementations of the current subject matter.

FIG. 2 illustrates an exemplary graph data 200 (e.g., showing a movie graph data) that may be stored in the database 108 and may be requested by the user 102, according to some implementations of the current subject matter. The graph data 200 may be stored in the database 108 in the vertex table 114 and/or the edge table 116. The graph data 200 may include a plurality of vertices including, for example, a first vertex 210a, a second vertex 210b, a third vertex 210c, and a fourth vertex 210d. Further, the plurality of vertices may be interconnected via a plurality of directed edges: a first edge 220a, a second edge 220b, a third edge 220c, and a fourth edge 220d.

Each vertex and/or edge in the graph data 200 may be associated with a key that uniquely identifies the corresponding vertex and/or edge. For example, the first vertex 210a may be associated with the key "a," the second vertex 210b may be associated with the key "b," the third vertex 210c may be associated with the key "c," and the fourth vertex 210d may be associated with the key "d." The first edge 220a may be associated with the key "1," the second edge 220b may be associated with the key "2," the third edge 220c may be associated with the key "3," and the fourth edge 220d may be associated with the key "4." Each vertex and/or edge in the graph data 200 may also be associated with one or more attributes. For example, each of the first vertex 210a, the second vertex 210b, the third vertex 210c, and the fourth vertex 210d may be associated with a "Title" attribute and a "Type" attribute. Each of the first edge 220a, the second edge 220b, the third edge 220c, and the fourth edge 220d may be associated with a "Type" attribute and/or a "Rating" attribute.

In some implementations, the user 102 may send to the relational database management system 106 a request to execute a graph algorithm on the graph data 200. In response to the request, the graph data engine 110 may be configured to generate an interface for accessing data from one or more tables stored in the database 108. In particular, the graph data engine 110 may be configured to execute a query of the graph data stored in the database 108 to obtain the desired results responsive to the request. The graph data engine 110 may be further configured to generate a specific query on a graph data stored in the database 108 that may be used to read data from tables stored in the database 108. The generated interface may then be used to present results responsive to the user 102's request. The results may be arranged in a tabular format, which may be used for execution of one or more SQL queries.

In some exemplary implementations, as stated above, the request from the user 102 may be in a declarative graph query language such as, for example, openCypher and/or the like. To generate an interface, the engine 110 and/or the component 112 may be configured to implement use of a graph (e.g., GRAPH_WORKSPACE, as available in High Performance Analytic Appliance ("HANA") system developed by SAP SE, Walldorf, Germany) object. A graph object may be a catalog object that may define a graph in terms of tables and columns: a vertex table, an edge table, a key column in the vertex table, a key column in the edge table, a source vertex column in the edge table, a target vertex column in the edge table, and/or any combination thereof. A graph object may be uniquely identified by a database schema it resides in and a workspace name. Multiple graph instances may be included in the same schema (e.g., with different workspace names) and/or different database schemas. Graph information may be stored in the system view (e.g., GRAPH_WORKSPACES as available in the HANA system developed by SAP SE, Walldorf, Germany).

To generate the interface that provides an ability to access graph data and output it in a table format for execution of SQL queries, the engine 110 and/or the component 112 may be configured to execute the following subquery (e.g., "OPENCYPHER_TABLE"):

```
OPENCYPHER_TABLE(
    <graph_workspace_spec>
    <opencypher_query_spec>
    [<opencypher_query_parameter_mapping_spec>]
)
```

The above subquery makes use of the graph workspace object. In particular, in this subquery, the clause <graph_workspace_spec> may be formatted as <graph_workspace_spec>:: =GRAPH WORKSPACE <sql_identifier>. It may be configured to identify a specific graph workspace that may be used in connection with a declarative language query (e.g., an openCypher query). The graph workspace may be identified using an <sql_identifier> parameter.

The specification of the query may be defined using <opencypher_query_spec>, which may be formatted as follows: <opencypher_query_spec>::=QUERY <string>. The <string> parameter may be a valid SQL character string constant that may include a declarative language query (e.g., openCypher query) formatted accordingly using SQL escape characters.

Further, the parameter specification of the above subquery may be defined using <opencypher_query_paramterer_spec>, which, in turn, may be formatted as follows: <opencypher_query_parameter_spec>::=PARAMETERS (<parameter_name>=<parameter_value>{<comma> <parameter_name>=<parameter_value>}). The <parameter_name> may refer to a SQL string that may include a name of a parameter used in the declarative language query (e.g., openCypher query). The <parameter_value> may correspond to a value of the parameter or SQL's positional parameter value placeholder denoted by '?' question mark symbol.

The following provides an exemplary subquery generated based on the above declarative language statement and may be used by the table interface component 112 to generate an interface for querying graph data stored in the database 108 and outputting results that may be queried using a SQL query:

```
SELECT * FROM OPENCYPHER_TABLE(
    GRAPH WORKSPACE "MySchema"."MyGraphWorkspace"
    QUERY 'MATCH (a) RETURN a.key, $MyParam'
    PARAMETERS ('$MyParam' = 42)
)
```

In the above, the GRAPH WORKSPACE "MySchema"."MyGraphWorkspace" may identify a reference to one or more graph workspaces (e.g., graph and/or tables being sought by the user's request). This may either be a direct reference to a graph workspace that has been previously defined, and/or a reference to one or more tables that comprise the graph (e.g., an inline definition of a graph workspace).

The QUERY 'MATCH (a) RETURN a.key, $MyParam' may correspond to a declarative language query (e.g., an openCypher query). The query may operate on a graph defined by the parameters in the GRAPH WORKSPACE clause and may also refers to parameters identified in the PARAMETERS clause. The PARAMETERS ('$MyParam'=42) may enable use of parameters in the declarative language query (e.g., an openCypher query).

The following provides a discussion of additional exemplary subqueries that may be executed by the graph engine 110 and/or component 112 for the purposes of generating the above interface.

The following subquery may be configured to return identifiers of vertices from the "BUSINESS_NETWORK"."GRAPH" graph that have an age attribute having a value greater than 42 and have 'worksFor' relationship to vertices named 'SAP SE'.

```
SELECT ID FROM OPENCYPHER_TABLE(
    GRAPH WORKSPACE "BUSINESS_NETWORK"."GRAPH"
    QUERY 'MATCH (a)–[e]–>(b) RETURN a.ID AS ID WHERE e.type = "worksFor"
    AND a.age > $ageParam AND b.name = $companyParam'
    PARAMETERS ('$ageParam' = 42, '$companyParam' = 'SAP SE')
);
```

The "BUSINESS_NETWORK"."GRAPH" is the reference to the graph workspace (view) object that may be stored in a memory location (e.g., database's catalog), where BUSINESS_NETWORK is a normal catalog schema name and GRAPH is the graph workspace (view) object name. The QUERY string is the query in a declarative query language (e.g., the openCypher language) that may follow SQL escaping rules for strings. The PARAMETERS clause may be configured to allow issuance of parameterized or prepared queries (which may be useful for query plan caching). The above query above may also be rewritten as follows (omitting the PARAMETERS clause):

```
SELECT ID FROM OPENCYPHER_TABLE(
    GRAPH WORKSPACE "BUSINESS_NETWORK"."GRAPH"
    QUERY 'MATCH (a)-[e]->(b) RETURN a.ID AS ID WHERE e.type = "worksFor"
AND a.age > 42 AND b.name = "SAP SE"'
);
```

The above queries may be also rewritten for the purposes of caching and subsequent reuse for multiple parameter value sets. The below query plan uses SQL's standard way of positional parameters (as denoted with '?'). The PARAMETERS clause may translate the SQL's positional parameters into declarative query language's (e.g., openCypher) named parameters.

```
SELECT ID FROM OPENCYPHER_TABLE(
    GRAPH WORKSPACE "BUSINESS_NETWORK"."GRAPH"
    QUERY 'MATCH (a)-[e]->(b) RETURN a.ID AS ID WHERE e.type = "worksFor"
AND a.age > $ageParam AND b.name = $companyParam'
    PARAMETERS ('$ageParam' = ?, '$companyParam' = ?)
);
```

Figure 3:
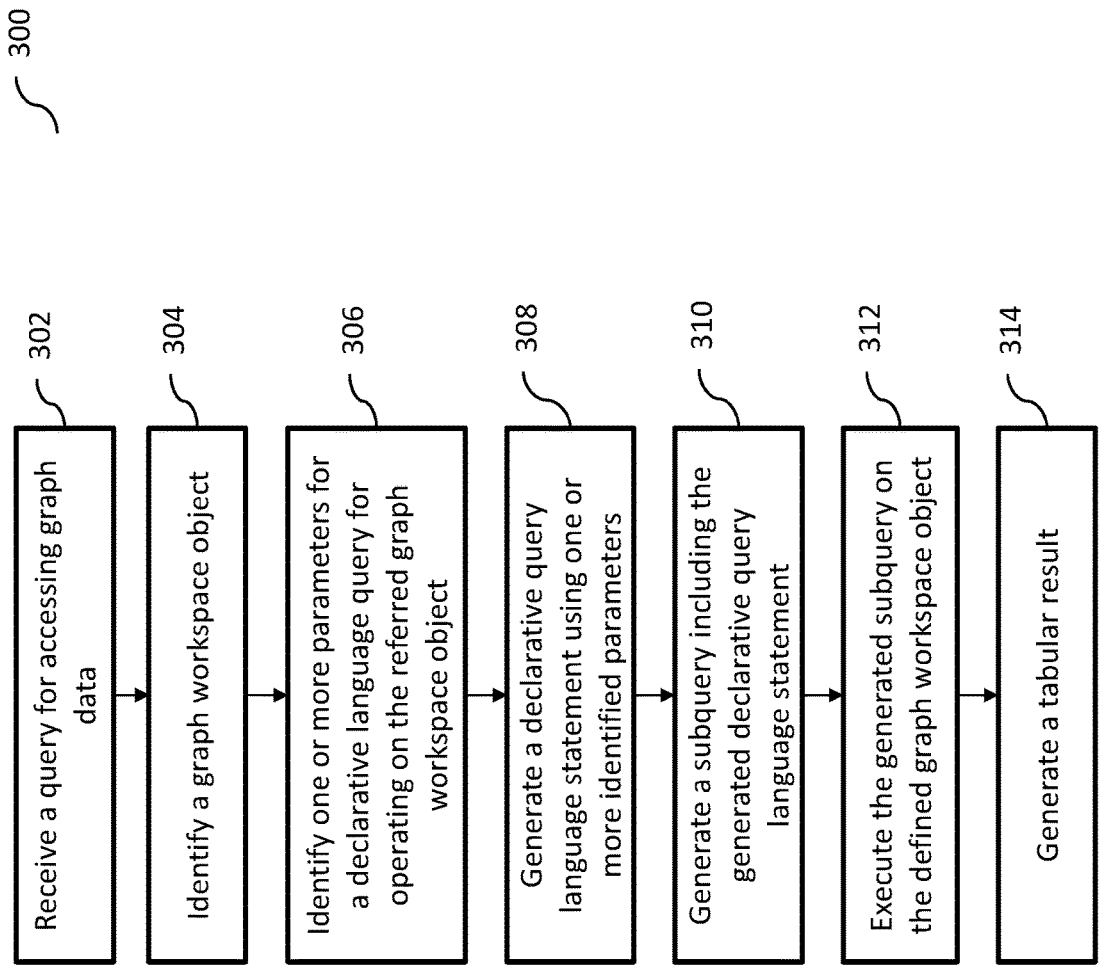
FIG. 3 illustrates an exemplary process for executing a graph algorithm, according to some implementations of the current subject matter.

FIG. 3 illustrates an exemplary process 300 for executing a graph algorithm, according to some implementations of the current subject matter. The process 300 may be performed using the database management system 106 in response to a request from the client 102 to execute a graph algorithm on graph data stored in the database 108, for example, in the vertex table 114 and/or the edge table 116.

At 302, the database management system 106 may be configured to respond to a request from the user 102 to execute a graph algorithm, such as by receiving a query to access graph data stored in the database 108. The system 106 may be configured to determine graph data that may be required to execute the graph algorithm. In an exemplary implementation, the database management system 100 may receive, from the user 102, a request to execute a graph algorithm on the graph data 200 (shown in FIG. 2), which may be stored in the database 108 coupled with the database management system 106. The graph algorithm may be any algorithm that derives a solution by operating on the graph data 200 including, for example, shortest path, risk propagation, minimum flow, page rank, and/or the like. As noted, the user 102 may request the database management system 106 to execute a predefined graph algorithm and/or a custom graph algorithm defined, for example, by the user 102.

At 304, the database management system 106 may be configured to identify a graph workspace object. As stated above, a graph workspace object may be a catalog object that may define a graph in terms of tables and columns: a vertex table, an edge table, a key column in the vertex table, a key column in the edge table, a source vertex column in the edge table, a target vertex column in the edge table, and/or any combination thereof. A graph workspace may be uniquely identified by a database schema it resides in and a workspace name. Multiple graph workspaces instances may be included in the same schema (e.g., with different workspace names) and/or different database schemas. The graph workspace may be referred to using the following expression <graph_workspace_spec>::=GRAPH WORKSPACE <sql_identifier>, which may identify a specific graph workspace for use with a declarative language query (e.g., an openCypher query). The graph workspace may be identified using an <sql_identifier> parameter. In some exemplary implementations, the graph workspace may be defined using the following syntax:

```
CREATE GRAPH WORKSPACE <name> (e.g., "MySchema"."MyGraph")
    EDGE TABLE <name> (e.g., "MySchema"."myEdges")
        SOURCE COLUMN <col_name> (e.g., "from")
        TARGET COLUMN <col_name> (e.g., "to")
        KEY COLUMN <col_name> (e.g., "id")
    VERTEX TABLE <name> (e.g., "MySchema"."nodes")
        KEY COLUMN <col_name>, (e.g., "ID")
where <name> is [<schema_name>] <object_name> and <col_name> is a column
name.
```

In some exemplary implementations, the above "CREATE . . . " may be executed prior to execution of the statement "SELECT*FROM OPENCYPHER_TABLE (GRAPH WORKSPACE "MySchema". "MyGraph" QUERY 'MATCH (a) RETURN a.ID')". The graph workspace object may be defined within the query using the following statement:

```
SELECT * FROM OPENCYPHER_TABLE (
    GRAPH WORKSPACE (EDGE TABLE "MySchema"."myEdges" SOURCE
```

```
COLUMN "from" TARGET COLUMN "to" KEY COLUMN "id" VERTEX TABLE
"MySchema"."nodes" KEY COLUMN "ID)
QUERY 'MATCH (a) RETURN a.ID');
```

Figure 4:
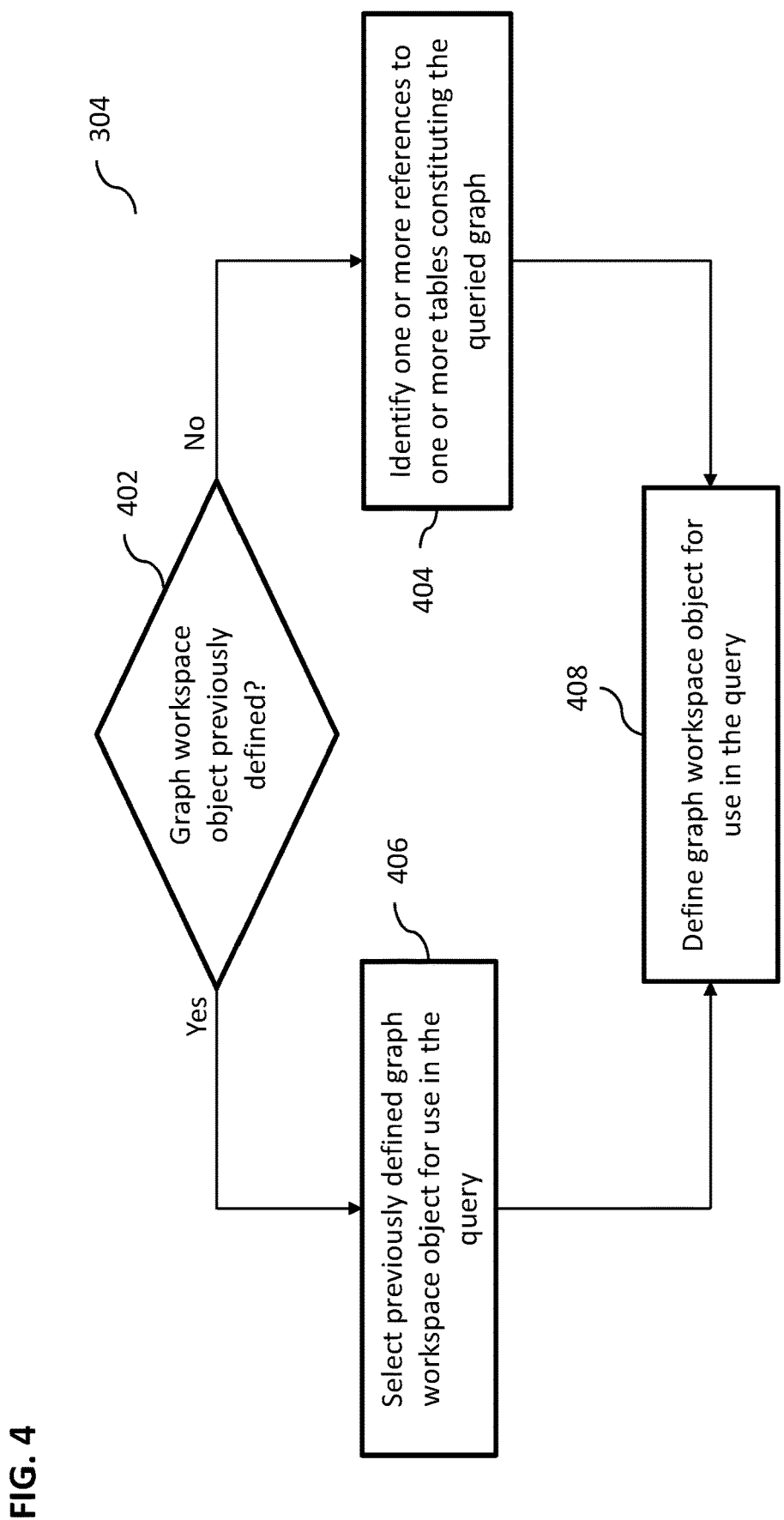
FIG. 4 illustrates additional details of the process shown in FIG. 3, according to some implementations of the current subject matter.

In some implementations, an existing graph workspace object may be used. Alternatively, one or more references to one or more tables stored in the database 108 may be identified. FIG. 4 illustrates additional details of the operation 304 shown in FIG. 3. At 402, the database management system 106 may be configured to determine whether the received query may use an existing or previously defined graph workspace object that may be already stored in the database 108 (or in any other storage or memory location). For example, a prior request to access graph data stored in the database 108 may have resulted in generation of a subquery that may have included the requisite graph workspace object, thereby allowing system 106 to reuse the defined graph workspace object, and hence, possibly the subquery, as discussed above.

If the graph workspace object has been previously defined, the graph workspace object may be selected, at 406, and the graph workspace object may be defined for use in the subquery, at 408. Otherwise, at 404, the database management system 106 may be configured to identify one or more references to one or more tables that may be stored in the database 108 and that may be configured to constitute the queried graph data. Subsequently, the graph workspace object may be thus defined, at 408.

Referring back to FIG. 3, the relational database management system 106 may be configured to determine or identify one or more parameters, at 306, that may be required to execute the graph algorithm by at least analyzing the programming code implementing the graph algorithm to identify the vertices and/or edges accessed by the graph algorithm. A declarative language query may use the identified parameters for operating on the referred graph workspace object that has been identified at 304. The identified parameters may be characterized by parameter specification that may be defined using <opencypher_query_paramterer_spec>. As stated above, the parameter specification may be formatted as follows: <opencypher_query_parameter_spec>::=PARAMETERS (<parameter_name>=<parameter_value>{<comma><parameter_name>=<parameter_value>}), where the <parameter_name> may refer to a SQL string that may include a name of a parameter used in the declarative language query (e.g., openCypher query) and <parameter_value> may correspond to a value of the parameter.

At 308, the database management system 106 may be configured to generate a declarative query language (e.g., an openCypher query language) statement that implements use of the parameters defined at 306. The declarative language statement may be characterized by a <opencypher_query_spec> specification having the following format <opencypher_query_spec>::=QUERY <string>, where <string> parameter may be a normal string (e.g., a normal string in SQL) that may include a declarative language query (e.g., openCypher query).

At 310, the database management system 106 may be configured to generate a subquery for use for querying the graph data that may be sought by the user 102 (at 302). The subquery may be configured to include the definition of the graph workspace (identified at 304), the parameters (identified at 306), and the declarative query language statement (generated at 308). As stated above, the subquery may be provided in the following format (in an exemplary scenario, where a graph is defined on top of tables, a subset of graph subqueries may be translated into an SQL subquery).

```
OPENCYPHER_TABLE(
    <graph_workspace_spec>
    <opencypher_query_spec>
    [<opencypher_query_parameter_ spec>]
)
```

It should be noted that the parameters of the subquery may be written in such a way as to allow caching and/or re-use of the subquery in future graph data queries (as discussed above). At 312, the database management system 106 may be configured to execute the generated subquery on the graph data stored in the database 108. An output of the execution may be generated in a tabular format, at 314. This may allow use of structured query language (SQL) to query this data.

In some implementations, the current subject matter may be implemented in various in-memory database systems, such as a High Performance Analytic Appliance ("HANA") system as developed by SAP SE, Walldorf, Germany. Various systems, such as, enterprise resource planning ("ERP") system, supply chain management system ("SCM") system, supplier relationship management ("SRM") system, customer relationship management ("CRM") system, and/or others, may interact with the in-memory system for the purposes of accessing data, for example. Other systems and/or combinations of systems may be used for implementations of the current subject matter. The following is a discussion of an exemplary in-memory system.

Figure 5:
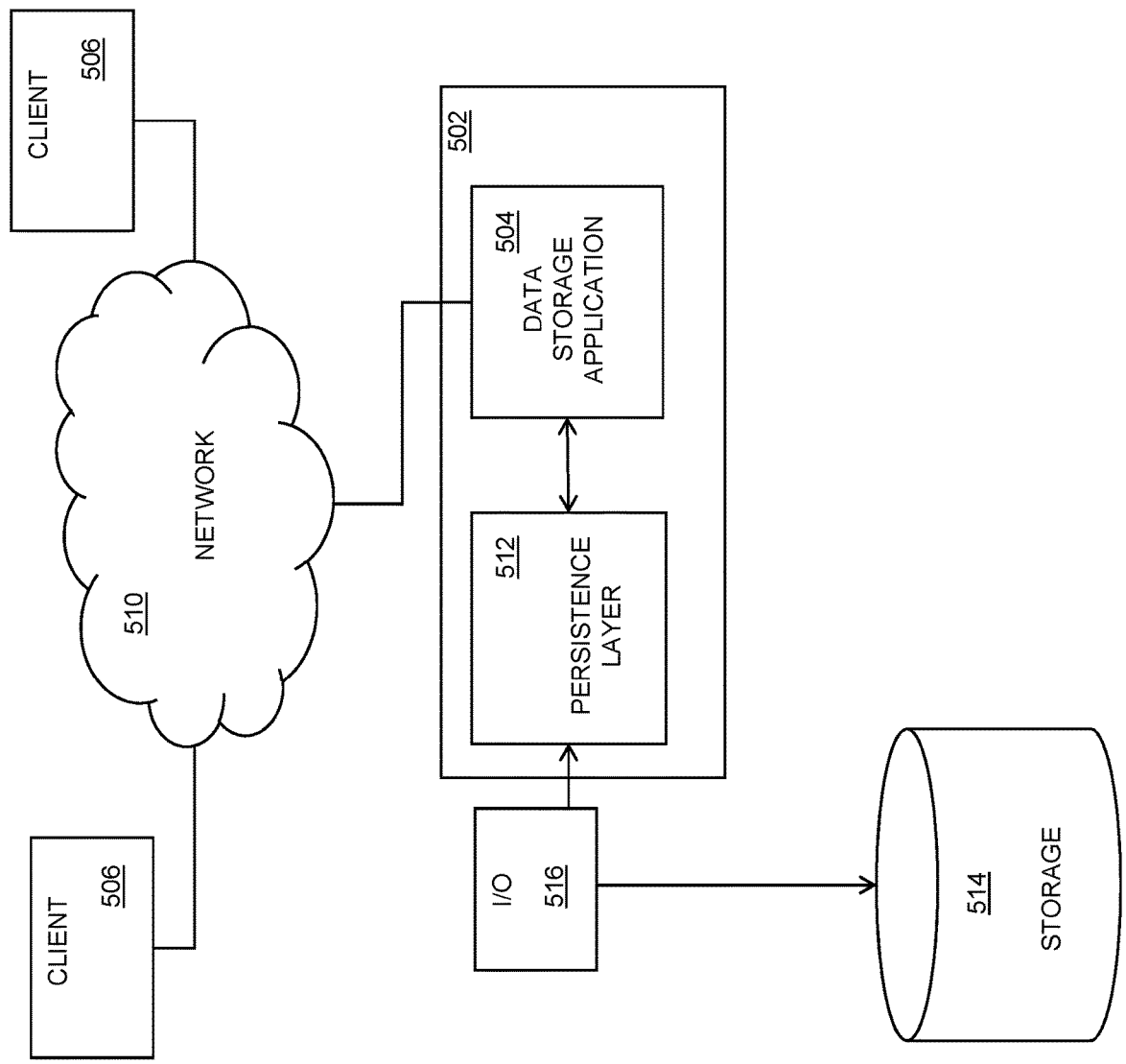
FIG. 5 is a diagram illustrating an exemplary system including a data storage application, according to some implementations of the current subject matter.

FIG. 5 illustrates an exemplary system 500 in which a computing system 502, which may include one or more programmable processors that may be collocated, linked over one or more networks, etc., executes one or more modules, software components, or the like of a data storage application 504, according to some implementations of the current subject matter. The data storage application 504 may include one or more of a database, an enterprise resource program, a distributed storage system (e.g. NetApp Filer available from NetApp of Sunnyvale, Calif.), or the like.

The one or more modules, software components, or the like may be accessible to local users of the computing system 502 as well as to remote users accessing the computing system 502 from one or more client machines 506 over a network connection 510. One or more user interface screens produced by the one or more first modules may be displayed to a user, either via a local display or via a display associated with one of the client machines 506. Data units of the data storage application 504 may be transiently stored in a persistence layer 512 (e.g., a page buffer or other type of temporary persistency layer), which may write the data, in the form of storage pages, to one or more storages 514, for example via an input/output component 516. The one or more storages 514 may include one or more physical storage media or devices (e.g. hard disk drives, persistent flash memory, random access memory, optical media, magnetic media, and the like) configured for writing data for longer term storage. It should be noted that the storage 514 and the input/output component 516 may be included in the computing system 502 despite their being shown as external to the computing system 502 in FIG. 5.

Data retained at the longer term storage 514 may be organized in pages, each of which has allocated to it a defined amount of storage space. In some implementations, the amount of storage space allocated to each page may be constant and fixed. However, other implementations in which the amount of storage space allocated to each page may vary are also within the scope of the current subject matter.

Figure 6:
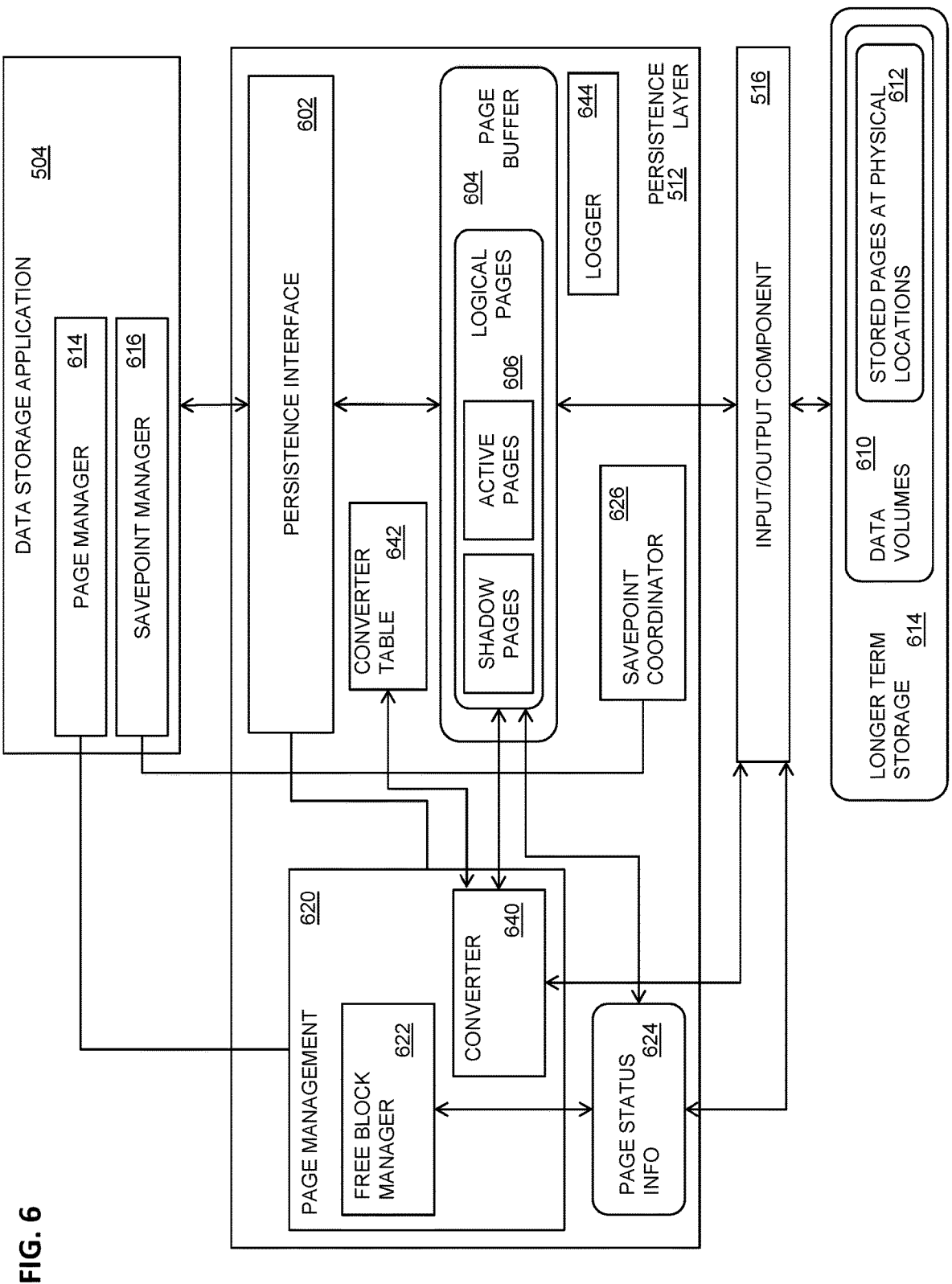
FIG. 6 is a diagram illustrating details of the system of FIG. 5.

FIG. 6 illustrates exemplary software architecture 600, according to some implementations of the current subject matter. A data storage application 504, which may be implemented in one or more of hardware and software, may include one or more of a database application, a network-attached storage system, or the like. According to at least some implementations of the current subject matter, such a data storage application 504 may include or otherwise interface with a persistence layer 512 or other type of memory buffer, for example via a persistence interface 602. A page buffer 604 within the persistence layer 512 may store one or more logical pages 606, and optionally may include shadow pages, active pages, and the like. The logical pages 606 retained in the persistence layer 512 may be written to a storage (e.g. a longer term storage, etc.) 514 via an input/output component 516, which may be a software module, a sub-system implemented in one or more of software and hardware, or the like. The storage 514 may include one or more data volumes 610 where stored pages 612 are allocated at physical memory blocks.

In some implementations, the data storage application 504 may include or be otherwise in communication with a page manager 614 and/or a savepoint manager 616. The page manager 614 may communicate with a page management module 620 at the persistence layer 512 that may include a free block manager 622 that monitors page status information 624, for example the status of physical pages within the storage 514 and logical pages in the persistence layer 512 (and optionally in the page buffer 604). The savepoint manager 616 may communicate with a savepoint coordinator 626 at the persistence layer 512 to handle savepoints, which are used to create a consistent persistent state of the database for restart after a possible crash.

In some implementations of a data storage application 504, the page management module of the persistence layer 512 may implement a shadow paging. The free block manager 622 within the page management module 620 may maintain the status of physical pages. The page buffer 604 may include a fixed page status buffer that operates as discussed herein. A converter component 640, which may be part of or in communication with the page management module 620, may be responsible for mapping between logical and physical pages written to the storage 514. The converter 640 may maintain the current mapping of logical pages to the corresponding physical pages in a converter table 642. The converter 640 may maintain a current mapping of logical pages 606 to the corresponding physical pages in one or more converter tables 642. When a logical page 606 is read from storage 514, the storage page to be loaded may be looked up from the one or more converter tables 642 using the converter 640. When a logical page is written to storage 514 the first time after a savepoint, a new free physical page is assigned to the logical page. The free block manager 622 marks the new physical page as "used" and the new mapping is stored in the one or more converter tables 642.

The persistence layer 512 may ensure that changes made in the data storage application 504 are durable and that the data storage application 504 may be restored to a most recent committed state after a restart. Writing data to the storage 514 need not be synchronized with the end of the writing transaction. As such, uncommitted changes may be written to disk and committed changes may not yet be written to disk when a writing transaction is finished. After a system crash, changes made by transactions that were not finished may be rolled back. Changes occurring by already committed transactions should not be lost in this process. A logger component 644 may also be included to store the changes made to the data of the data storage application in a linear log. The logger component 644 may be used during recovery to replay operations since a last savepoint to ensure that all operations are applied to the data and that transactions with a logged "commit" record are committed before rolling back still-open transactions at the end of a recovery process.

With some data storage applications, writing data to a disk is not necessarily synchronized with the end of the writing transaction. Situations may occur in which uncommitted changes are written to disk and while, at the same time, committed changes are not yet written to disk when the writing transaction is finished. After a system crash, changes made by transactions that were not finished must be rolled back and changes by committed transaction must not be lost.

To ensure that committed changes are not lost, redo log information may be written by the logger component 644 whenever a change is made. This information may be written to disk at latest when the transaction ends. The log entries may be persisted in separate log volumes while normal data is written to data volumes. With a redo log, committed changes may be restored even if the corresponding data pages were not written to disk. For undoing uncommitted changes, the persistence layer 512 may use a combination of undo log entries (from one or more logs) and shadow paging.

The persistence interface 602 may handle read and write requests of stores (e.g., in-memory stores, etc.). The persistence interface 602 may also provide write methods for writing data both with logging and without logging. If the logged write operations are used, the persistence interface 602 invokes the logger 644. In addition, the logger 644 provides an interface that allows stores (e.g., in-memory stores, etc.) to directly add log entries into a log queue. The logger interface also provides methods to request that log entries in the in-memory log queue are flushed to disk.

Log entries contain a log sequence number, the type of the log entry and the identifier of the transaction. Depending on the operation type additional information is logged by the logger 644. For an entry of type "update", for example, this would be the identification of the affected record and the after image of the modified data.

When the data application 504 is restarted, the log entries need to be processed. To speed up this process the redo log is not always processed from the beginning. Instead, as stated above, savepoints may be periodically performed that write all changes to disk that were made (e.g., in memory, etc.) since the last savepoint. When starting up the system, only the logs created after the last savepoint need to be processed. After the next backup operation the old log entries before the savepoint position may be removed.

When the logger 644 is invoked for writing log entries, it does not immediately write to disk. Instead it may put the log entries into a log queue in memory. The entries in the log queue may be written to disk at the latest when the corresponding transaction is finished (committed or aborted). To guarantee that the committed changes are not lost, the commit operation is not successfully finished before the corresponding log entries are flushed to disk. Writing log queue entries to disk may also be triggered by other events, for example when log queue pages are full or when a savepoint is performed.

With the current subject matter, the logger 644 may write a database log (or simply referred to herein as a "log") sequentially into a memory buffer in natural order (e.g., sequential order, etc.). If several physical hard disks/storage devices are used to store log data, several log partitions may be defined. Thereafter, the logger 644 (which as stated above acts to generate and organize log data) may load-balance writing to log buffers over all available log partitions. In some cases, the load-balancing is according to a round-robin distributions scheme in which various writing operations are directed to log buffers in a sequential and continuous manner. With this arrangement, log buffers written to a single log segment of a particular partition of a multi-partition log are not consecutive. However, the log buffers may be reordered from log segments of all partitions during recovery to the proper order.

As stated above, the data storage application 504 may use shadow paging so that the savepoint manager 616 may write a transactionally-consistent savepoint. With such an arrangement, a data backup comprises a copy of all data pages contained in a particular savepoint, which was done as the first step of the data backup process. The current subject matter may be also applied to other types of data page storage.

Figure 7:
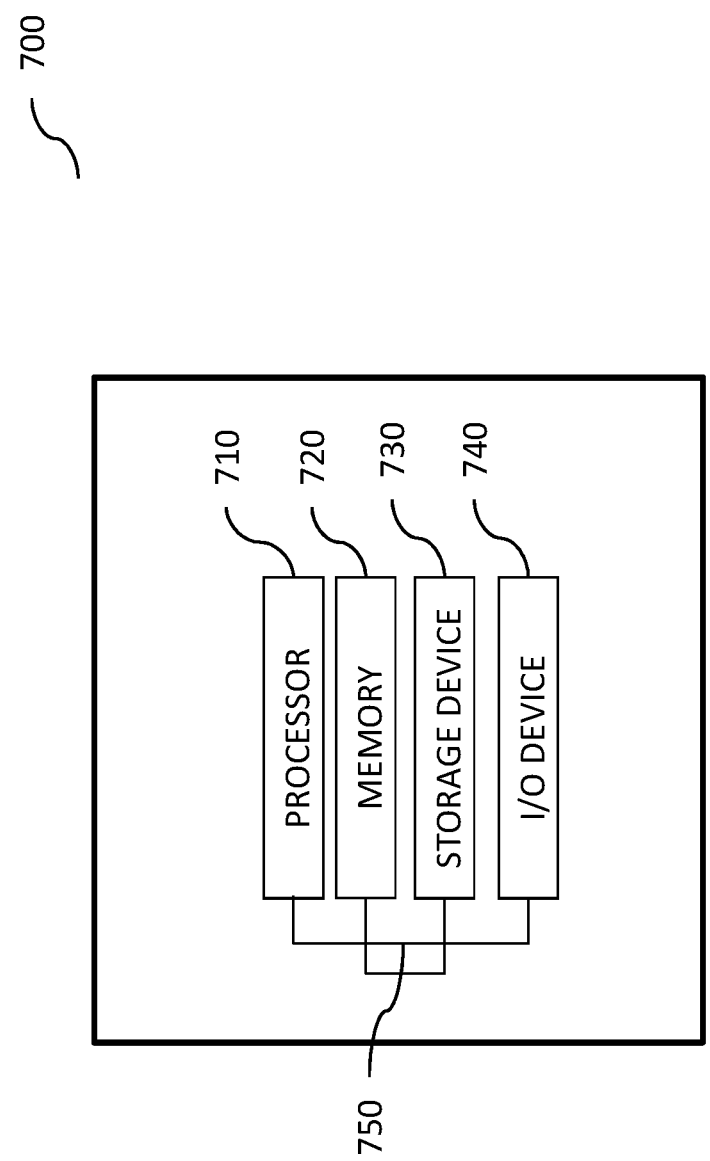
FIG. 7 is an exemplary system, according to some implementations of the current subject matter.

In some implementations, the current subject matter may be configured to be implemented in a system 700, as shown in FIG. 7. The system 700 may include a processor 710, a memory 720, a storage device 730, and an input/output device 740. Each of the components 710, 720, 730 and 740 may be interconnected using a system bus 750. The processor 710 may be configured to process instructions for execution within the system 700. In some implementations, the processor 710 may be a single-threaded processor. In alternate implementations, the processor 710 may be a multi-threaded processor. The processor 710 may be further configured to process instructions stored in the memory 720 or on the storage device 730, including receiving or sending information through the input/output device 740. The memory 720 may store information within the system 700. In some implementations, the memory 720 may be a computer-readable medium. In alternate implementations, the memory 720 may be a volatile memory unit. In yet some implementations, the memory 720 may be a non-volatile memory unit. The storage device 730 may be capable of providing mass storage for the system 700. In some implementations, the storage device 730 may be a computer-readable medium. In alternate implementations, the storage device 730 may be a floppy disk device, a hard disk device, an optical disk device, a tape device, non-volatile solid state memory, or any other type of storage device. The input/output device 740 may be configured to provide input/output operations for the system 700. In some implementations, the input/output device 740 may include a keyboard and/or pointing device. In alternate implementations, the input/output device 740 may include a display unit for displaying graphical user interfaces.

Figure 8:
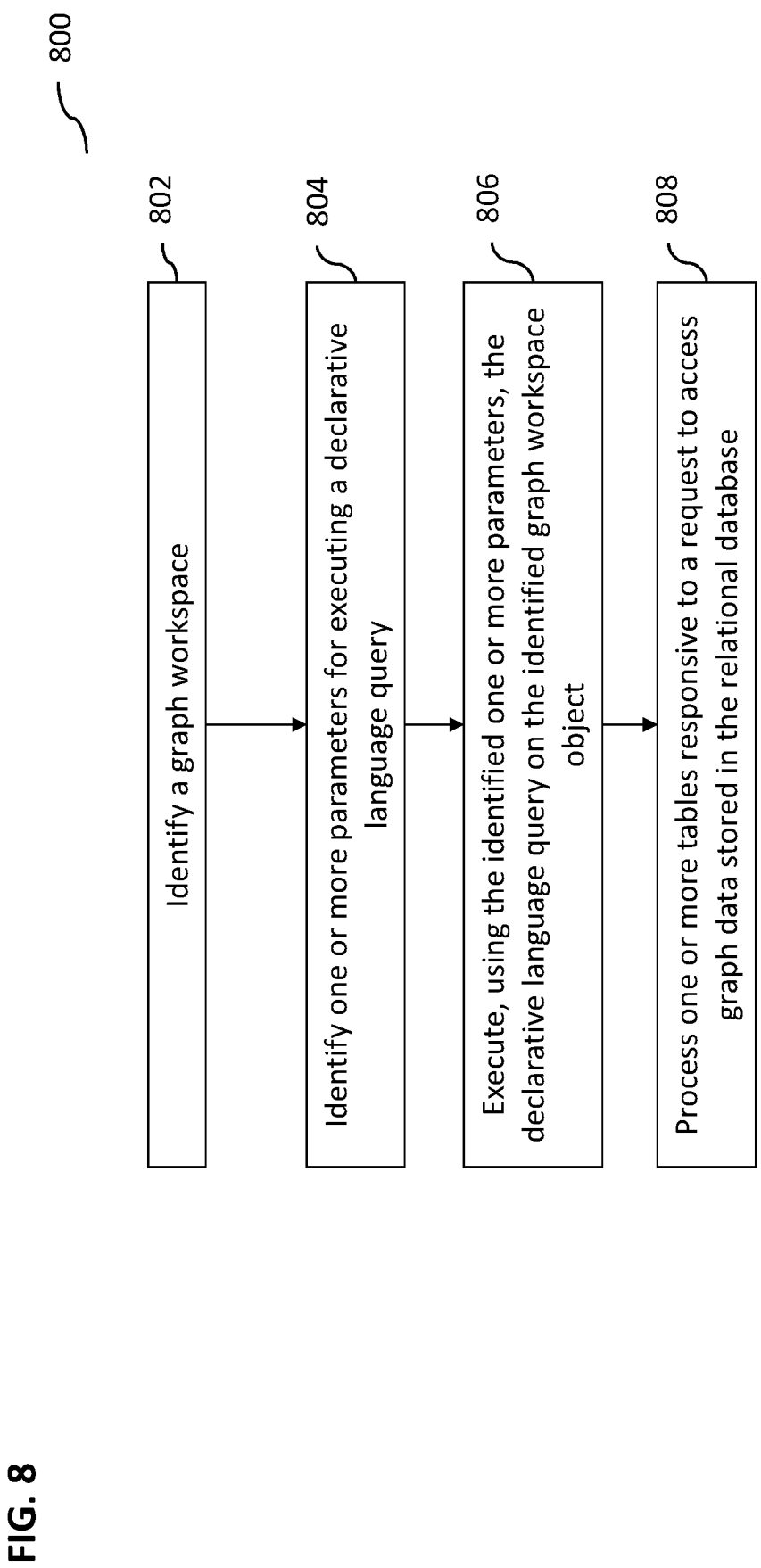
FIG. 8 is an exemplary method, according to some implementations of the current subject matter.

FIG. 8 illustrates an exemplary method 800 for querying graph data, according to some implementations of the current subject matter. The process 800 may be configured to be executed by the system 100 shown in FIG. 1, and in particular, the database management system 106. At 802, a graph workspace object may be identified. The graph workspace object may be identified based on a request to access graph data stored in a relational database (e.g., database 108 shown in FIG. 1) or, alternatively, or in addition to, be previously defined and stored in the database's catalog. The relational database management system 106 (as shown in FIG. 1) may be configured to locate the previously defined graph workspace object using <graph_workspace_spec>:: = GRAPH WORKSPACE <sql_identifier>.

At 804, based on the received request, one or more parameters for executing a declarative language query (e.g., an openCypher query) may be identified. As stated above, the parameters may be identified using the following expression <opencypher_query_parameter_spec>::=PARAMETERS (<parameter_name>=<parameter_value>{<comma> <parameter_name>=<parameter_value>}). The parameters may relate to the graph data being sought in the received request.

At 806, the declarative language query may be executed on the identified graph workspace object using the identified one or more parameters. The declarative language query may be, for example, written as follows <opencypher_query_spec>::=QUERY <string>.

At 808, one or more tables responsive to the received request to access graph data stored in the relational database may be processed as a result of executing the declarative language query.

In some implementations, the current subject matter may include one or more of the following optional features. As stated above, the graph workspace object may be identified in response to the received request to access graph data and/or be a previously defined graph workspace object stored in the relational database. Alternatively, the definition of the graph workspace object may include determining one or more references to one or more tables stored in the relational database. A combination of the one or more tables may correspond to the graph data being requested in the received request.

In some implementations, the declarative language query (e.g., openCypher query) may be a previously generated declarative language query that may be configured to use the identified parameters that may have any value (e.g., as defined using "?", as discussed above).

In some implementations, the process may also include executing a structured query language (SQL) query on the resulting processed table which can also be combined with more tables.

In some implementations, the parameters may be defined using a structured language query string. Further, the graph workspace object may also be defined using a structured language query identifier. The graph data may include at least one of the following: one or more vertices, one or more edges, and any combination thereof.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows illustrated in the accompanying figures and/or described herein do not necessarily require the particular order shown, or sequential order, to achieve desirable results. Other implementations can be within the scope of the following claims.

What is claimed:

1. A computer-implemented method, comprising:
identifying, using a database management system, a graph workspace object in a plurality of graph workspace objects in response to a request to access graph data stored in a relational database, the graph data being defined using a database schema of the relational database, the schema defining the plurality of graph workspace objects;
identifying, using the database management system, one or more parameters for executing one or more declarative language queries, the declarative language queries including one or more openCypher queries and being generated by the database management system in response to identification of the one or more parameters;
executing, using the identified one or more parameters, the one or more declarative language queries on the identified graph workspace object;
generating one or more interfaces based on the executing of the one or more declarative language queries;
accessing, using the generated one or more interfaces, one or more tables responsive to the request to access graph data stored in the relational database;
processing, based on the executed declarative language queries, the one or more tables responsive to the request to access graph data stored in the relational database;
translating, using the generated one or more interfaces, the declarative language queries to generate a structured language query; and
executing the structured query language query on the processed one or more tables and providing one or more outputs resulting from the executing of the structured query language query using the one or more generated interfaces.

2. The method according to claim 1, wherein the identified graph workspace object is at least one of the following: identified based on the request to access graph data stored in the relational database, a previously defined graph workspace object stored in the relational database, and any combination thereof.

3. The method according to claim 1, wherein the defining the graph workspace object further comprises determining one or more references to one or more tables stored in the relational database, wherein a combination of the one or more tables corresponds to the graph data being requested in the received request.

4. The method according to claim 1, wherein the declarative language query is a previously generated declarative language query configured to use the one or more identified parameters having any value.

5. The method according to claim 1, wherein the one or more parameters are defined using a structured language query string, and the graph workspace object is defined using a structured language query identifier.

6. The method according to claim 1, wherein the graph data includes at least one of the following: one or more vertices, one or more edges, and any combination thereof.

7. A system comprising:
at least one programmable processor; and
a non-transitory machine-readable medium storing instructions that, when executed by the at least one programmable processor, cause the at least one programmable processor to perform operations comprising:
identifying, using a database management system, a graph workspace object in a plurality of graph workspace objects in response to a request to access graph data stored in a relational database, the graph data being defined using a database schema of the relational database, the schema defining the plurality of graph workspace objects;
identifying, using the database management system, one or more parameters for executing one or more declarative language queries, the declarative language queries including one or more openCypher queries and being generated by the database management system in response to identification of the one or more parameters;
executing, using the identified one or more parameters, the one or more declarative language queries on the identified graph workspace object;
generating one or more interfaces based on the executing of the one or more declarative language queries;
accessing, using the generated one or more interfaces, one or more tables responsive to the request to access graph data stored in the relational database;
processing, based on the executed declarative language queries, the one or more tables responsive to the request to access graph data stored in the relational database;
translating, using the generated one or more interfaces, the declarative language queries to generate a structured language query; and
executing the structured query language query on the processed one or more tables and providing one or more outputs resulting from the executing of the structured query language query using the one or more generated interfaces.

8. The system according to claim 7, wherein the identified graph workspace object is at least one of the following: identified based on the request to access graph data stored in the relational database, a previously defined graph workspace object stored in the relational database, and any combination thereof.

9. The system according to claim 7, wherein the defining the graph workspace object further comprises determining one or more references to one or more tables stored in the relational database, wherein a combination of the one or more tables corresponds to the graph data being requested in the received request.

10. The system according to claim 7, wherein the declarative language query is a previously generated declarative language query configured to use the one or more identified parameters having any value.

11. The system according to claim 7, wherein the one or more parameters are defined using a structured language query string, and the graph workspace object is defined using a structured language query identifier.

12. The system according to claim 7, wherein the graph data includes at least one of the following: one or more vertices, one or more edges, and any combination thereof.

13. A computer program product comprising a non-transitory machine-readable medium storing instructions that, when executed by at least one programmable processor, cause the at least one programmable processor to perform operations comprising:
identifying, using a database management system, a graph workspace object in a plurality of graph workspace objects in response to a request to access graph data stored in a relational database, the graph data being defined using a database schema of the relational database, the schema defining the plurality of graph workspace objects;
identifying, using the database management system, one or more parameters for executing one or more declarative language queries, the declarative language queries including one or more openCypher queries and being generated by the database management system in response to identification of the one or more parameters;
executing, using the identified one or more parameters, the one or more declarative language queries on the identified graph workspace object;
generating one or more interfaces based on the executing of the one or more declarative language queries;
accessing, using the generated one or more interfaces, one or more tables responsive to the request to access graph data stored in the relational database;
processing, based on the executed declarative language queries, the one or more tables responsive to the request to access graph data stored in the relational database;
translating, using the generated one or more interfaces, the declarative language queries to generate a structured language query; and
executing the structured query language query on the processed one or more tables and providing one or more outputs resulting from the executing of the structured query language query using the one or more generated interfaces.

14. The computer program product according to claim 13, wherein the identified graph workspace object is at least one of the following: identified based on the request to access graph data stored in the relational database, a previously defined graph workspace object stored in the relational database, and any combination thereof.

15. The computer program product according to claim 13, wherein the defining the graph workspace object further comprises determining one or more references to one or more tables stored in the relational database, wherein a combination of the one or more tables corresponds to the graph data being requested in the received request.

16. The computer program product according to claim 13, wherein the declarative language query is a previously generated declarative language query configured to use the one or more identified parameters having any value.

17. The computer program product according to claim 13, wherein the one or more parameters are defined using a structured language query string, and the graph workspace object is defined using a structured language query identifier.

\* \* \* \* \*